US007999244B2

(12) United States Patent
Davis et al.

(10) Patent No.: US 7,999,244 B2
(45) Date of Patent: Aug. 16, 2011

(54) MEMS DEVICES AND RELATED SCANNED BEAM DEVICES

(75) Inventors: Wyatt Davis, Bothell, WA (US);
Gregory T. Gibson, Snohomish, WA (US); Hakan Urey, Istanbul (TR);
Thomas W. Montague, Mercer Island, WA (US); Bin Xue, Mukilteo, WA (US);
John Lewis, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 479 days.

(21) Appl. No.: 12/004,090

(22) Filed: Dec. 18, 2007

(65) Prior Publication Data
US 2009/0153932 A1 Jun. 18, 2009

(51) Int. Cl.
*G01N 21/86* (2006.01)
(52) U.S. Cl. .................. 250/559.29; 359/224.1
(58) Field of Classification Search .... 359/198.1–199.4, 359/200.6–200.8, 202.1, 221.2, 223.1–225.1, 359/226.2, 290–292, 838, 846, 871, 872; 250/204, 559.06, 559.29, 230, 234; 347/255–260; 353/39, 98–99
See application file for complete search history.

(56) References Cited

U.S. PATENT DOCUMENTS

| | | | | | |
|---|---|---|---|---|---|
| 4,313,074 | A | * | 1/1982 | Nomura et al. | 318/608 |
| 5,796,231 | A | * | 8/1998 | Kyodo | 318/608 |
| 6,924,476 | B2 | * | 8/2005 | Wine et al. | 250/235 |
| 7,376,525 | B2 | * | 5/2008 | Desailly et al. | 702/72 |
| 2005/0020926 | A1 | * | 1/2005 | Wiklof et al. | 600/476 |
| 2005/0184351 | A1 | * | 8/2005 | Fu | 257/415 |
| 2007/0252540 | A1 | * | 11/2007 | Rakov et al. | 318/254 |
| 2008/0178682 | A1 | * | 7/2008 | Wojciechowski | 73/778 |
| 2009/0086300 | A1 | * | 4/2009 | Blake | 359/199 |

OTHER PUBLICATIONS

Serway, Raymond A. Physics for Scientists and Engineers vol. 2, 4th ed. (Philadelphia, 1996).*

* cited by examiner

*Primary Examiner* — Jennifer L Doak
(74) *Attorney, Agent, or Firm* — Kevin D. Wills

(57) ABSTRACT

Embodiments relate to a MEMS device including a scanner rotatable about at least one rotation axis, with the scanner having a characteristic resonant frequency. According to one embodiment, the MEMS device includes drive electronics operable to generate a drive signal that causes the scanner to oscillate at an operational frequency about the at least one rotation axis. The drive signal has a drive frequency selected to be about equal to the characteristic resonant frequency or a sub-harmonic frequency of the characteristic resonant frequency. According to another embodiment, the drive electronics are operable to generate a drive signal having a plurality of drive-signal pulses that moves the scanner at an operational frequency and sensing electronics are operable to sense a position of the scanner only when the drive-signal pulses of the drive signal are not being transmitted by the drive electronics. The MEMS device embodiments may be incorporated in scanned beam imagers, endoscopes, and displays.

15 Claims, 8 Drawing Sheets

MEMS DEVICES AND RELATED SCANNED BEAM DEVICES

BACKGROUND

Micro-electro-mechanical systems ("MEMS") are currently employed in a variety of different applications. A few widely used applications for MEMS devices include scanned beam displays, scanned beam imagers, and scanned beam endoscopes.

A typical scanned beam display includes a MEMS die formed from a semiconductor substrate having a reflective scanner supported by torsion arms about which the scanner may rotate. In operation, an image may be generated by modulating light emitted from a light source (e.g., a light-emitting diode, a laser, etc.) and scanning the emitted light by rotating the scanner. Various optical components (e.g., lenses) may be used to modify the light before scanning, after scanning from the scanner, or both. For example, in a head-mounted display, a beam may be scanned through a viewer's pupil to generate the image on the viewer's retina.

In a scanned beam imager, a beam may be scanned across a field-of-view ("FOV") and affected by the FOV, such as being reflected by an object to be imaged. The affected light may be collected and an image may be generated that is characteristic of the FOV.

In order to accurately generate the image, the rotational position of the reflective scanner should be accurately determined. In one conventional approach, the position of the scanner may be determined using photodetectors. Another conventional approach for determining the scanner position is by mounting resistive material on the torsion arms that changes resistance as the torsion arms are twisted. The change in resistance may be correlated with the position of the scanner. For comb-drive MEMS scanners, dedicated sensor-comb fingers different than the drive comb fingers may be provided. Capacitance between a fixed sensor comb fingers of the MEMS scan frame and the moving sensor-comb fingers may be determined. The rotational position of the scanner may be correlated to the measured capacitance. The aforementioned approaches typically rely on adding additional components to the system (e.g., photodetectors), additional electrical connections, requires separate components (e.g., the sensor comb fingers) that consume valuable space on a MEMS die, among other problems.

SUMMARY

Embodiments relate to a MEMS device including a scanner rotatable about at least one rotation axis, with the scanner having a characteristic resonant frequency. According to one embodiment, the MEMS device includes drive electronics operable to generate a drive signal that causes the scanner to oscillate at an operational frequency about the at least one rotation axis. The drive signal has a drive frequency selected to be about equal to the characteristic resonant frequency or a sub-harmonic frequency of the resonant frequency. According to another embodiment, the drive electronics are operable to generate a drive signal having a plurality of drive-signal pulses that moves the scanner at an operational frequency and sensing electronics are operable to sense a position of the scanner only when the drive-signal pulses of the drive signal are not being transmitted by the drive electronics.

In other embodiments, the principles of the above-described MEMS devices may be incorporated in scanned beam imagers, scanned beam endoscopes, scanned beam displays, and other MEMS applications.

BRIEF DESCRIPTION OF THE DRAWINGS

The drawings illustrate several embodiments, wherein like reference numerals refer to like or similar elements in different views or embodiments shown in the drawings.

DETAILED DESCRIPTION

Embodiments described herein relate to MEMS devices including sensing electronics operable to determine a rotational position of a MEMS scanner when drive electronics thereof are not transmitting drive-signal pulses and MEMS devices including drive electronics operable to generate a drive signal having a frequency that is about equal to a fundamental resonant frequency of the MEMS scanner or a sub-harmonic frequency of the MEMS scanner fundamental resonant frequency. Additional embodiments relate to scanned beam imagers, scanned beam endoscopes, scanned beam displays, and other MEMS applications that incorporate principles of such MEMS devices.

Figure 1:
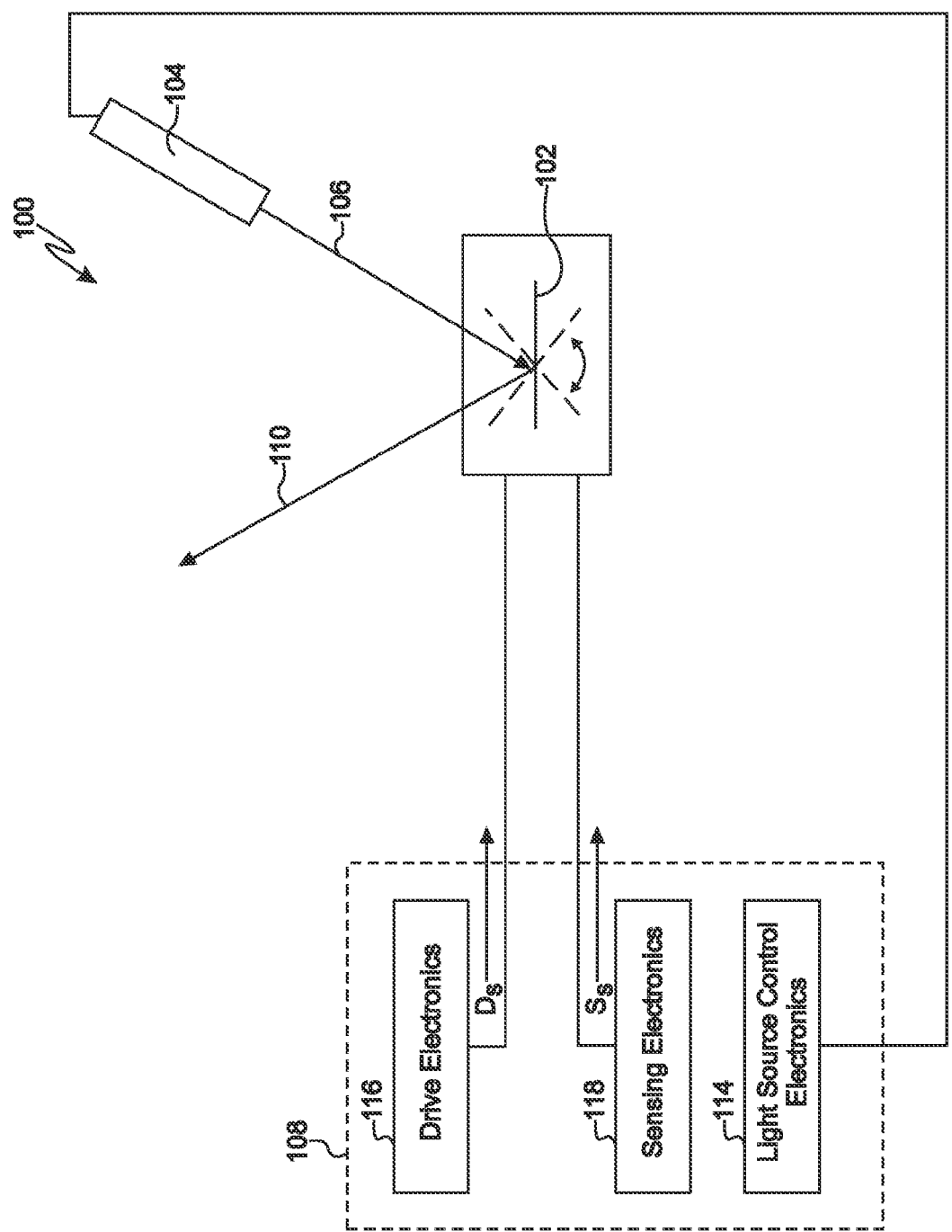
FIG. 1 is a diagrammatic view of a MEMS device including sensing electronics operable to determine a rotational position of a MEMS scanner when drive electronics are not transmitting drive-signal pulses according to one embodiment.

FIG. 1 is a diagrammatic view of a MEMS device 100, according to one embodiment, operable to sense a rotational position of a MEMS scanner when drive electronics thereof are not transmitting drive-signal pulses. The MEMS device 100 includes a MEMS scanner 102 having a characteristic resonant frequency $f_r$, at least one light source 104 operable to emit a beam of light 106 (e.g., a converging, diverging, or generally collimated beam), and control electronics 108 operably coupled to the MEMS scanner 102 and the light source 104. For example, the at least one light source 104 may be a laser, an LED, or another suitable light source. The MEMS scanner 102 may be a uniaxial or a biaxial MEMS scanner driven electrostatically, magnetically, or by combinations thereof. The MEMS scanner 102 is positioned to receive the beam 106 and oscillate at an operational frequency $f_o$ to reflectively scan the beam 106 (represented as scanned beam 110). The operational frequency $f_o$ is typically about equal to the resonant frequency $f_r$ (e.g., equal to the resonant frequency or slightly larger or smaller than the resonant frequency $f_r$). For example, the MEMS scanner 102 may scan the beam 106 to generate a video image according to a video image signal as in a scanned beam display or scan the beam 106 across a FOV and collect affected light from the FOV to generate an image characteristic of the FOV as in a scanned beam imager. Although not shown, additional optical components may be positioned in the path of the beam 106, scanned beam 110, or both, such as lenses, mirrors, diffractive elements, refractive elements, or other suitable optical components configured to modify a characteristic of the beam 106, scanned beam 110, or both.

Still referring to FIG. 1, the control electronics 108 of the MEMS device 100 include a light-source control electronics 114 operably coupled to the at least one light source 104. For example, the light-source control electronics 114 may be configured to modulate the intensity of the beam 106 output from the at least one light source 104. The control electronics 108 further include drive electronics 116 configured to generate a drive signal $D_S$ for oscillating the MEMS scanner 102 about a selected axis between a rotational position A and B (the zero crossing or neutral position of the MEMS scanner 102 shown as position Z) at the operational frequency $f_o$. The control electronics 108 also include sensing electronics 118 configured to generate a sensing signal $S_S$ for sensing a rotational position (i.e., angle) of the MEMS scanner 102 only when drive-signal pulses of the drive signal $D_S$ are not being transmitted by the drive electronics 116. In operation, responsive to instructions from the control electronics 108, the at least one light source 104 outputs the beam 106, which is received by the MEMS scanner 102 and scanned as the beam 110.

Figure 2A:
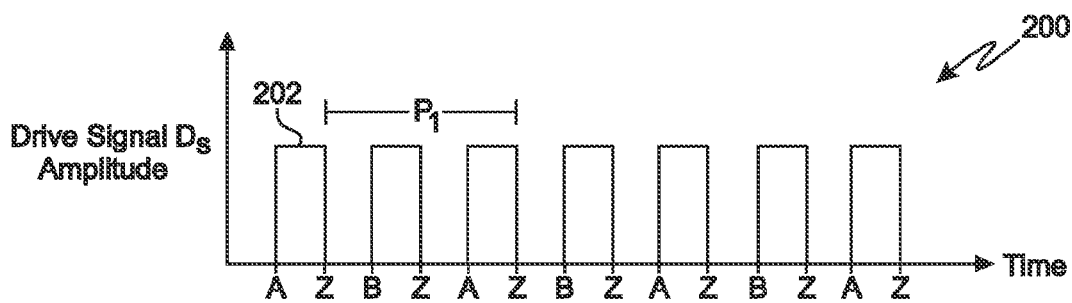
FIG. 2A is a graph of a conventional drive signal that may be used to oscillate the MEMS scanner of the MEMS device shown in FIG. 1.
Figure 2B:
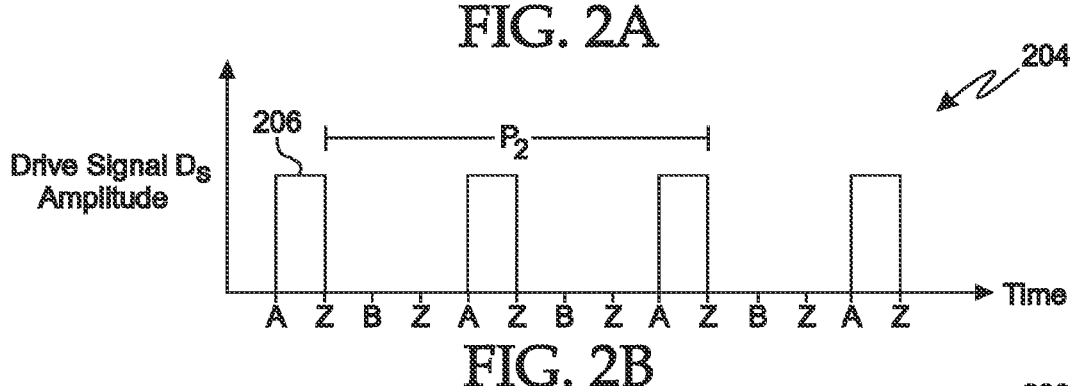
FIG. 2B is a graph of a drive signal having a drive frequency that is about equal to a characteristic resonant frequency or a sub-harmonic frequency of the resonant frequency of the MEMS scanner of the MEMS device shown in FIG. 1 for oscillating the MEMS scanner according to one embodiment.

The operation of the MEMS scanner 102 is described with reference to the various drive signals shown in FIGS. 2A-2C in conjunction with the sensing signal shown in FIG. 3. For ease of understanding, in FIGS. 2A-2C and 3, the rotational position of the MEMS scanner 102 (FIG. 1) is indicated with identifiers A, B, and Z along the horizontal time axes of the graphs and corresponds to the rotational positions A, B, and Z shown in FIG. 1. FIG. 2A shows a conventional drive signal 200 that may be used to drive the MEMS scanner 102. The drive signal 200 includes a plurality of drive-signal pulses 202 exhibiting a drive period $P_1$ corresponding to a drive frequency that is approximately equal to two times the operational frequency $f_o$ of the MEMS scanner 102 (FIG. 1). When the MEMS scanner 102 is at the rotational position A, one drive-signal pulse 202 may be transmitted to rotate the MEMS scanner 102 to the zero crossing Z. The MEMS scanner 102 continues to rotate to the rotational position B without application of one of the drive-signal pulses 202, followed by another drive-signal pulse 202 being transmitted that rotates the MEMS scanner 102 back to the zero crossing Z. The MEMS scanner 102 continues to rotate to the rotational position A. Thus, the drive signal 200 causes the MEMS scanner 102 to oscillate at the operational frequency $f_o$ between the rotational positions A and B to scan the beam 110 (FIG. 1).

One embodiment for driving and sensing a rotational position of the MEMS scanner 102 is described with reference to FIGS. 2B and 3. FIG. 2B shows a drive signal 204 that may be generated by the drive electronics 116 (FIG. 1) to drive the MEMS scanner 102 and includes a plurality of drive-signal pulses 206. The drive signal 204 exhibits a drive period $P_2$ corresponding to a drive frequency that is approximately equal to the characteristic resonant frequency $f_r$ (i.e., the fundamental resonant frequency) or a sub-harmonic frequency of the resonant frequency $f_r$ of the MEMS scanner 102. A sub-harmonic frequency of a characteristic resonant frequency is an integer fraction of the characteristic resonant frequency. For example, the frequency of the drive signal 204 may be a sub-harmonic frequency of the MEMS scanner 102 and equal to $2 \cdot f_r/n$, where n is an integer equal to or greater than three, such as n=3, 4, 5, etc. However, when the drive frequency of the drive signal 204 is about equal to a sub-harmonic frequency of the characteristic resonant frequency $f_r$, the MEMS scanner 102 still oscillates at the operational frequency $f_o$ that is approximately equal to the resonant frequency $f_r$.

Figure 3:
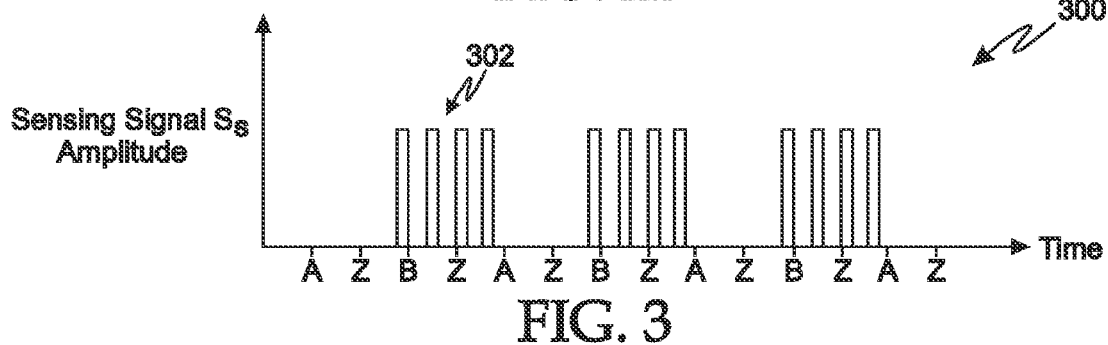
FIG. 3 is a graph of a sensing signal that may be used to sense a parameter indicative of a rotational position of the MEMS scanner of the MEMS device shown in FIG. 1 when drive-signal pulses are not being transmitted according to one embodiment.

Referring to FIG. 3, the sensing electronics 118 generate a sensing signal 300 including a plurality of sensing-signal pulses 302. For example, respective sensing-signal pulses 302 may comprise a plurality of discrete pulses. The timing and period of the sensing signal 300 is selected so that the sensing-signal pulses 302 are transmitted during the period of time between consecutive drive-signal pulses 206 (FIG. 2B) of the drive signal 204 in order to sense a physical parameter that may be correlated to a rotational position of the MEMS scanner 102. In one embodiment, the sensing signal 208 may be used to sense a physical parameter indicative of when the MEMS scanner 102 passes through the zero crossing Z. For example, as will be discussed in more detail with respect to the electrostatically-driven MEMS scanners shown in FIGS. 4 and 5, the sensing electronics 118 may generate the sensing signal 300 so that capacitance between fixed comb fingers of a MEMS frame and moving comb fingers of a MEMS scanner may be measured and correlated to a specific rotational position of the MEMS scanner.

Figure 2C:
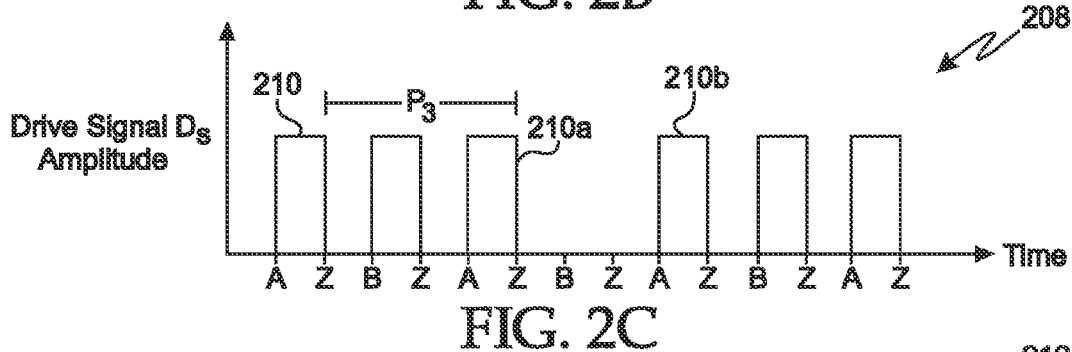
FIG. 2C is a graph of a drive signal for oscillating the MEMS scanner according to another embodiment.

FIG. 2C shows a drive signal 208 according to another embodiment that may be used to drive the MEMS scanner 102 in conjunction with the sensing signal 300 shown in FIG. 3 for determining a rotational position of the MEMS scanner 102. The drive signal 208 includes a plurality of drive-signal pulses 210 exhibiting a drive period $P_3$ corresponding to a drive frequency that is approximately equal to two times the operational frequency $f_o$ of the MEMS scanner 102 (FIG. 1) that oscillates the MEMS scanner 102 at the operational frequency $f_o$. However, random or selected drive-signal pulses 202 may be omitted. For example, one of the drive-signal pulses is omitted between the drive-signal pulses 210a and 210b. The sensing signal 300 transmitted from the sensing electronics 118 may still be used to determine a rotational position of the MEMS scanner 102, except only the sensed parameter measured during periods in which the sensing electronics 118 has sufficient sensitivity is used to determine the rotational position of the MEMS scanner 102. For example, the parameter sensed between the drive signals 210a and 210b may be correlated with a rotational position of the MEMS scanner 102.

Figure 2D:
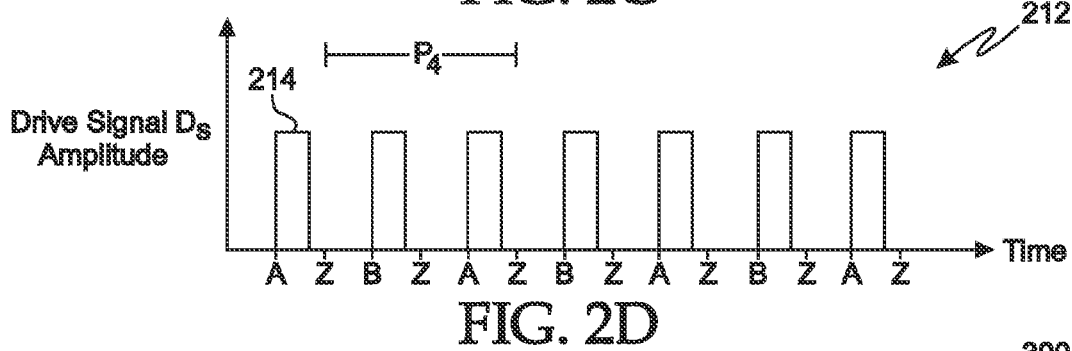
FIG. 2D is a graph of a drive signal for oscillating the MEMS scanner according to another embodiment.

FIG. 2D shows a drive signal 212 according to another embodiment that may be used to drive the MEMS scanner 102. The drive signal 212 includes a plurality of drive-signal pulses 214 exhibiting a drive period $P_4$ corresponding to a drive frequency that may be approximately equal to two times the operational frequency $f_o$ of the MEMS scanner 102 (FIG. 1). The drive signal 212 oscillates the MEMS scanner 102 at the operational frequency $f_o$. Respective drive-signal pulses 214 may be terminated prior to the MEMS scanner 102 reaching the zero crossing Z. The sensing signal $S_S$ transmitted from the sensing electronics 118 may be used to measure a parameter related to the rotational position of the MEMS scanner 102 between consecutive drive-signal pulses 214. For example, the sensing electronics 118 may measure a parameter related to the rotational position as the MEMS scanner 102 passes through the zero crossing Z.

In another embodiment, the drive electronics 116 may generate the drive signal 200 shown in FIG. 2A and the sensing-signal pulses 302 generated by the sensing electronics 118 may be used to measure a parameter related to the rotational position of the MEMS scanner 102 during the time periods between consecutive drive-signal pulses 202.

It should be noted that embodiments of other waveforms are contemplated for the drive signals that drive the MEMS scanner 102, such as a sinusoidal-type waveform or another suitable waveform, while still allowing sensing of the rotational position of the MEMS scanner 102 during "dead periods" between drive-signal pulses.

It is also contemplated that in other embodiments, the drive signal 204 (FIG. 2B), which may have a drive frequency that is about equal to the characteristic resonant frequency $f_r$ or a sub-harmonic frequency of the resonant frequency $f_r$ of the MEMS scanner 102, may be used to drive the MEMS scanner 102 and the rotational position of the MEMS scanner 102 may be determined in a conventional fashion (e.g., using a resistive material, photosensors, separate sensor comb fingers, etc.). Moreover, in such an embodiment, the sensing may be performed during periods in which the drive signal 204 is not transitioning from a high value to a low value or vice versa, or during periods other than the periods between consecutive drive pulses 206. In certain embodiments, the drive frequency of the drive signal 204 may be selected to be a sub-harmonic frequency of the resonant frequency $f_r$ of the MEMS scanner 102 that does not excite undesirable resonant responses in the MEMS scanner 102. For example, undesirable resonant responses in the MEMS scanner 102 may be resonant responses other than the desired rotational mode.

Figure 4:
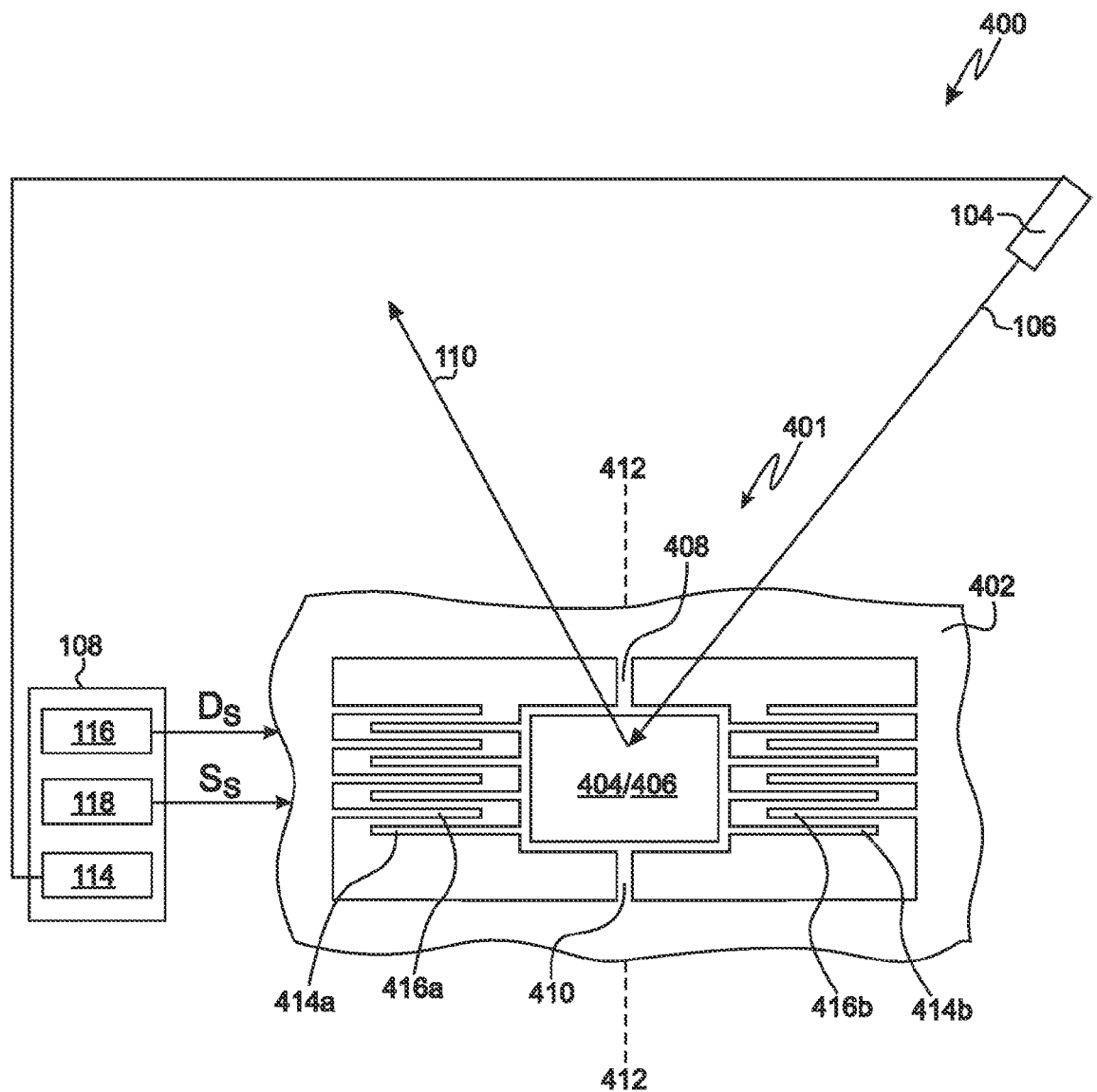
FIG. 4 is a schematic plan view of a MEMS device that incorporates principles of the MEMS device shown in FIG. 1, according to one embodiment, and includes an electrostatic comb drive configured to rotate a scanner about a single axis.

FIG. 4 is a schematic plan view of a MEMS device 400 that incorporates principles of the MEMS device 100 shown in FIG. 1, according to one embodiment, and includes an electrostatic comb drive configured to rotate a scanner about a single axis. The MEMS device 400 comprises a MEMS die 401 including a substrate 402 (e.g., a single-crystal silicon substrate or other semiconductor substrate that functions as a frame) having a scanner 404 formed therein with a reflective surface 406. The scanner 404 is rotatably connected to the substrate 402 via respective torsion arms 408 and 410 that, together, define a rotation axis 412. The MEMS die 401 includes an electrostatic comb-drive actuator comprising comb fingers 414a and 414b extending from the scanner 404 and corresponding fixed comb fingers 416a and 416b extending from the substrate 402.

In operation, the drive electronics 116 of the control electronics 108 may apply a time-varying voltage drive signal $D_S$ between the comb fingers 414a and 416a and the comb fingers 414b and 416b. For example, the drive signal $D_S$ may have a waveform similar to any of the drive signals 200, 204, 208, or 212 shown in FIGS. 2A-2D, such as having a frequency selected to be about equal to a sub-harmonic frequency of the scanner 404 or other frequency. The application of the drive signal $D_S$ causes the comb fingers 414a and 414b to be periodically electrostatically attracted to corresponding fixed comb fingers 416a and 416b thereby twisting the torsion arms 408 and 410 and causing the scanner 404 to oscillate about the rotation axis 412 at an operational frequency $f_o$. Oscillating of the scanner 404 responsive to the drive signal $D_S$ enables scanning the beam 106 output from the light source 104 (represented as the scanned beam 110) in a one-dimensional scan pattern that may be used for image generation as in a scanned beam display or to scan and image a FOV as in a scanned beam imager.

Additionally, as previously described with respect to the MEMS device 100 shown in FIG. 1, the sensing electronics 118 may determine a rotational position of the scanner 404. For example, the sensing electronics 118 may generate the sensing signal $S_S$ in order to sense a capacitance between the comb fingers 414a and 414b and corresponding fixed comb fingers 416a and 416b, which may be correlated to the rotational position of the scanner 404. Such capacitance sensing may be performed at or near the zero crossing, or at another time period in which the sensing electronics 118 has sufficient sensitivity to measure capacitance. Furthermore, the sensing electronics 118 may transmit pulses of the sensing signal $S_S$ only when the drive electronics 116 are not transmitting drive-signal pulses of the drive signal $D_S$.

It is noted that in the MEMS die 401 shown in FIG. 4, the comb fingers 414a-b and 416a-b are employed for both effecting rotation of the scanner 404 and sensing capacitance, to determine a rotational position of the scanner 404. Thus, dedicated sensor-comb fingers may be omitted, which may provide for a relatively more compact MEMS die 401.

Figure 5:
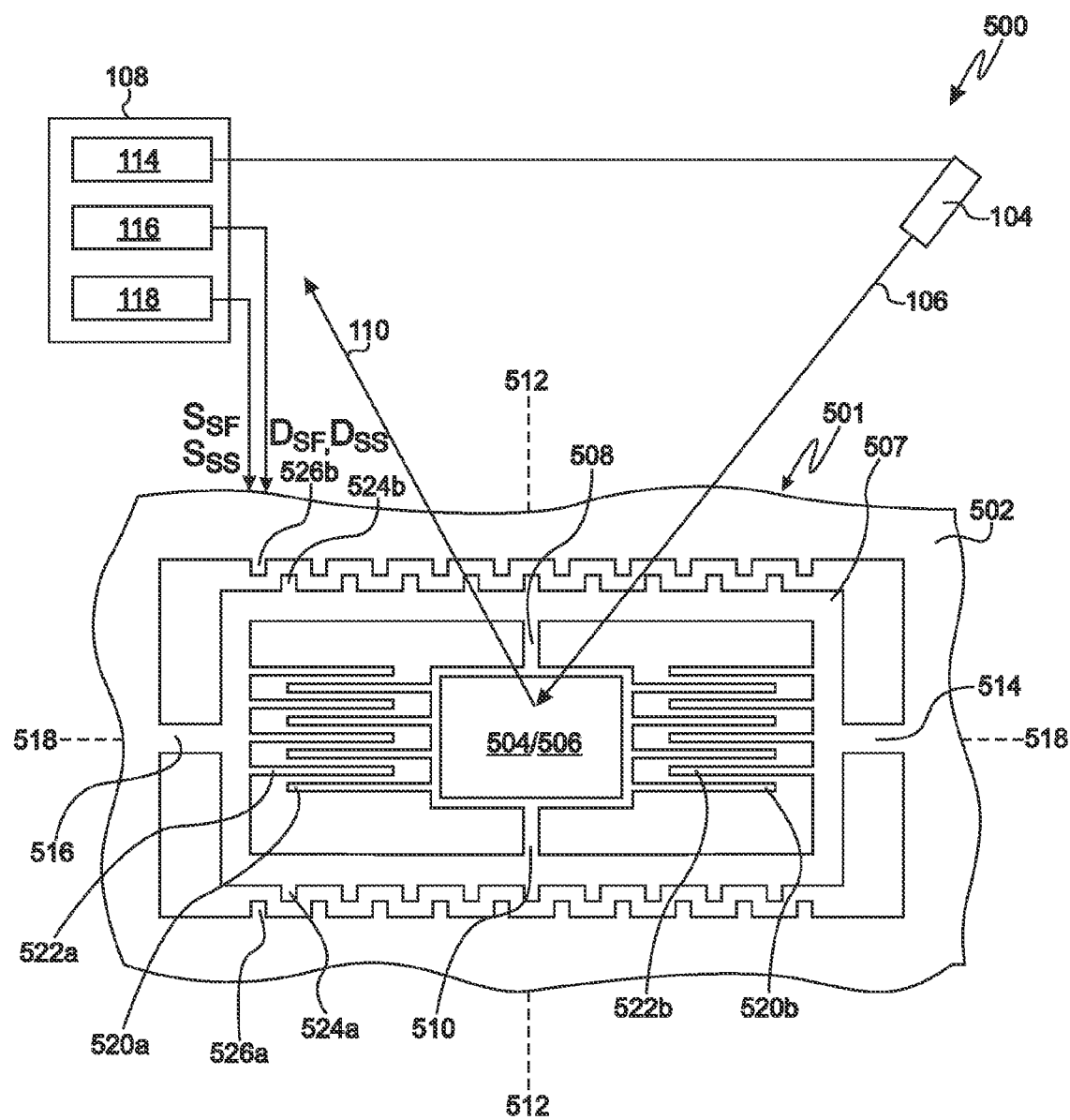
FIG. 5 is a schematic plan view of a MEMS device that incorporates principles of the MEMS device shown in FIG. 1, according to one embodiment, and includes electrostatic comb drives configured to rotate a scanner about a fast-scan axis and a slow-scan axis.

FIG. 5 is a schematic plan view of a MEMS device 500 that incorporates principles of the MEMS device 100 shown in FIG. 1, according to one embodiment, and includes electrostatic comb drives configured to rotate a scanner about a fast-scan axis and a slow-scan axis. The MEMS device 500 comprises a MEMS die 501 including a substrate 502 (e.g., a single-crystal silicon substrate or other semiconductor substrate that functions as a frame) having a scanner 504 formed therein with a reflective surface 506. The scanner 504 is rotatably connected to a gimbal frame 507 via respective torsion arms 508 and 510 that, together, define a fast-scan rotation axis 512. The gimbal frame 507 is rotatably connected to the substrate 502 via respective torsion arms 514 and 516 that, together, define a slow-scan rotation axis 518 that is generally perpendicular to the fast-scan rotation axis 512.

Still referring to FIG. 5, the MEMS die 501 includes a fast-scan electrostatic comb-drive actuator comprising comb fingers 520a and 520b extending from the scanner 504 and corresponding comb fingers 522a and 522b extending from the gimbal frame 507. The MEMS die 501 also includes a slow-scan electrostatic comb-drive actuator comprising comb fingers 524a and 524b extending from the gimbal frame 507 and corresponding comb fingers 526a and 526b extending from the substrate 502.

In operation, the drive electronics 116 of the control electronics 108 may apply a time-varying voltage fast-scan drive signal $D_{SF}$ between the comb fingers 520a and 522a and the comb fingers 520b and 522b. For example, the drive signal $D_{SF}$ may have a waveform similar to any of the drive signals 200, 204, 208, or 212 shown in FIGS. 2A-2D), such as a waveform having a frequency selected to be about equal to a sub-harmonic frequency of the scanner 504 or other frequency.

The application of the drive signal $D_{SF}$ causes the comb fingers 520a and 520b to be periodically electrostatically attracted to corresponding fixed comb fingers 522a and 522b. The periodic attraction between the comb fingers 520a and 522a and the comb fingers 520b and 522b thereby twists the torsion arms 508 and 510 and causes the scanner 504 to oscillate about the fast-scan rotation axis 512 at a fast-scan operational frequency. The drive electronics 116 of the control electronics 108 may also apply a time-varying voltage fast-scan drive signal $D_{SS}$ between the comb fingers 524a and 526a and the comb fingers 524b and 526b. For example, the drive signal $D_{SS}$ may have a waveform similar to any of the drive signals 204, 208, or 212 shown in FIGS. 2A-2D), such as a waveform having a frequency selected to be about equal to a sub-harmonic frequency of the scanner 504 or other frequency. The application of the drive signal $D_{SS}$ causes the comb fingers 524a and 524b to be periodically electrostatically attracted to corresponding fixed comb fingers 526a and 526b. The periodic attraction between the comb fingers 524a and 526a and the comb fingers 524b and 526b thereby twists the torsion arms 514 and 516 and causes the scanner 504 to oscillate about the slow-scan rotation axis 518 at a slow-scan operational frequency less than that of the fast-scan operational frequency. Oscillating the scanner 504 about the fast-scan rotation axis 512 and the slow-scan rotation axis 518 responsive to the drive signals $D_{SS}$ and $D_{SF}$ enables scanning the beam 106 output from the light source 104 (represented as the scanned beam 110) in a two-dimensional scan pattern that may be used for image generation as in a scanned beam display or to scan and image a FOV as in a scanned beam imager.

Additionally, as previously described with respect to the MEMS device 100 shown in FIG. 1, the sensing electronics 118 may determine a rotational position of the scanner 504 about the fast-scan rotation axis 512. For example, the sensing electronics 118 may generate the sensing signal $S_{SF}$ in order to determine a capacitance between the comb fingers 520a and 520b and corresponding fixed comb fingers 522a and 522b, which may be correlated to a rotational position of the scanner 504 about the fast-scan rotation axis 512. The sensing electronics 118 may also determine a rotational position of the scanner 504 about the slow-scan rotation axis 518. For example, the sensing electronics 118 may generate the sensing signal $S_{SS}$ in order to determine sense a capacitance between the comb fingers 524a and 524b and corresponding fixed comb fingers 526a and 526b, which may be correlated to a rotational position of the scanner 504 about the slow-scan rotation axis 518. Furthermore, the sensing electronics 118 may only transmit pulses of the sensing signal $S_{SF}$ for sensing the fast-scan rotational position when the drive electronics 116 are not transmitting drive-signal pulses of the fast-scan drive signal $D_{SF}$ and the sensing electronics 118 only transmits pulses of the sensing signal $S_{SS}$ for sensing the slow-scan rotational position only when the drive electronics 116 are not transmitting drive-signal pulses of the fast-scan drive signal $D_{SS}$. In certain embodiments, the sensing signal $S_{SS}$ may be transmitted when both the drive signal $D_{SF}$ and $D_{SS}$ are not being transmitted.

As with the MEMS device 400, the fast-scan comb drive and slow-scan comb drive of the MEMS device 500 may be employed for both effecting rotation of the scanner 504 and sensing a parameter related to a rotational position of the scanner 504. Thus, dedicated sensor-comb fingers may be omitted, which may provide for a relatively more compact MEMS die 501.

Figure 6:
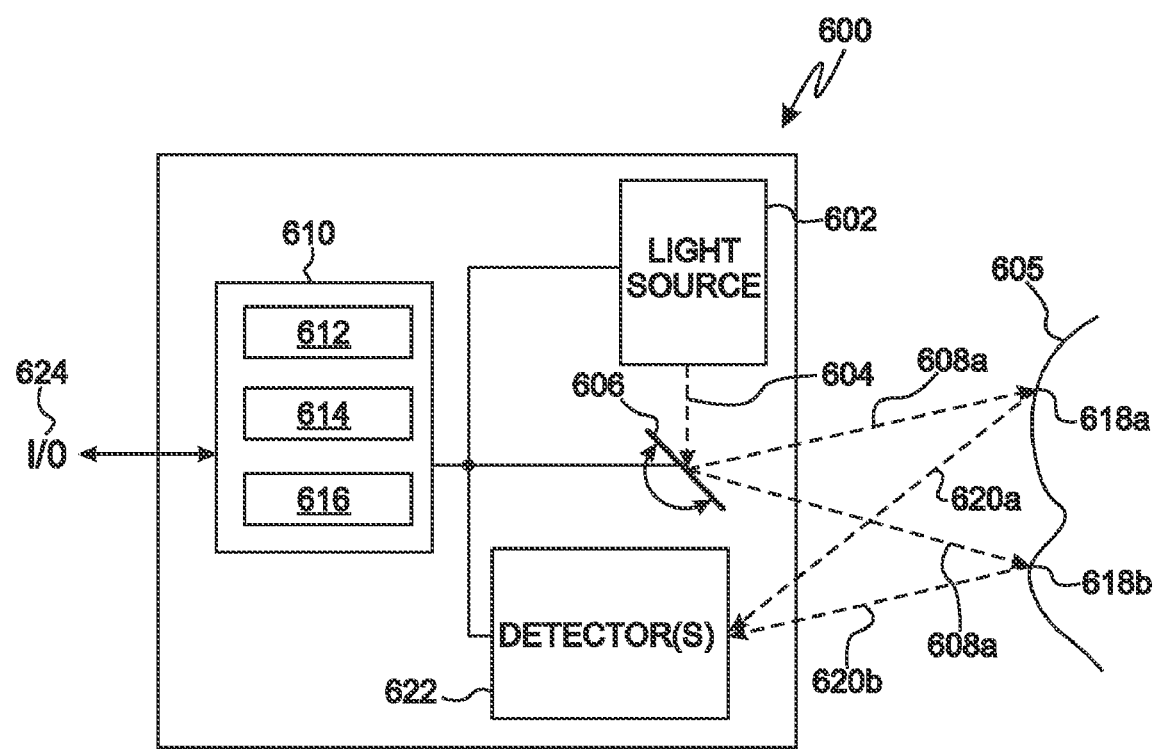
FIG. 6 is a diagrammatic view of a scanned beam imager, according to another embodiment, including a MEMS scanner that incorporates principles of the MEMS device shown in FIG. 1.

Referring to the diagrammatic view of FIG. 6, principles of any of the above-described MEMS device embodiments may be employed in a scanned beam imager 600 for imaging a FOV. The scanned beam imager 600 includes a light source 602 (e.g., a laser, an LED, or another suitable light source) operable to emit a beam of light 604. A MEMS scanner 606 is positioned to receive and scan the beam 604 across a FOV 605 as a scanned beam 608. For example, the MEMS scanner 606 may be configured and operated as the aforementioned MEMS scanners 100, 400, and 500. The scanned beam imager 600 includes control electronics 610 comprising drive electronics 612 that outputs a drive signal with a drive frequency to drive the motion of the MEMS scanner 606 at an operational frequency, sensing electronics 614 that determines a rotational position of the MEMS scanner 606 by sensing a parameter related to the rotational position (e.g., capacitance), and light-source control electronics 616 that controls the output of the beam 604 from the light source 602. The drive electronics 612 and sensing electronics 614 function the same or similarly to the drive electronics 116 and sensing electronics 118 of the MEMS device 100 shown in FIG. 1. For example, the drive signal may have a waveform similar to any of the drive signals 200, 204, 208, or 212 shown in FIGS. 2A-2D.

Still referring to FIG. 6, instantaneous positions of the scanned beam 608 are designated as 608a and 608b. The scanned beam 604 sequentially illuminates locations 618 in the FOV at locations 618a and 618b, respectively. While the scanned beam 608 illuminates the locations, a portion of the illuminating scanned beam 608 is reflected (e.g., specular reflected light and diffuse reflected light also referred to as scattered light), absorbed, refracted, or otherwise affected according to the properties of the object or material at the locations to produce reflected light 620a and 620b. At least a portion of the reflected light 620a and 620b is received by one or more detectors 622 (e.g., PIN photodiodes or other suitable photodetectors), which generates electrical signals corresponding to the amount of light energy received. The control electronics 610 processes the electrical signals and generates a digital representation of the FOV 605, which is transmitted for further processing, decoding, archiving, printing, display, or other treatment or use via interface 624. Because the sensing electronics 614 may determine a rotational position of the scanner 606 during "dead periods" in which the drive-signal pulses are not being transmitted, the position information may be more accurate and may be utilized to more accurately relate the received reflected light 620 to a location on the FOV 605 in order to generate relatively more defined digital representation of the FOV 605.

Figure 7:
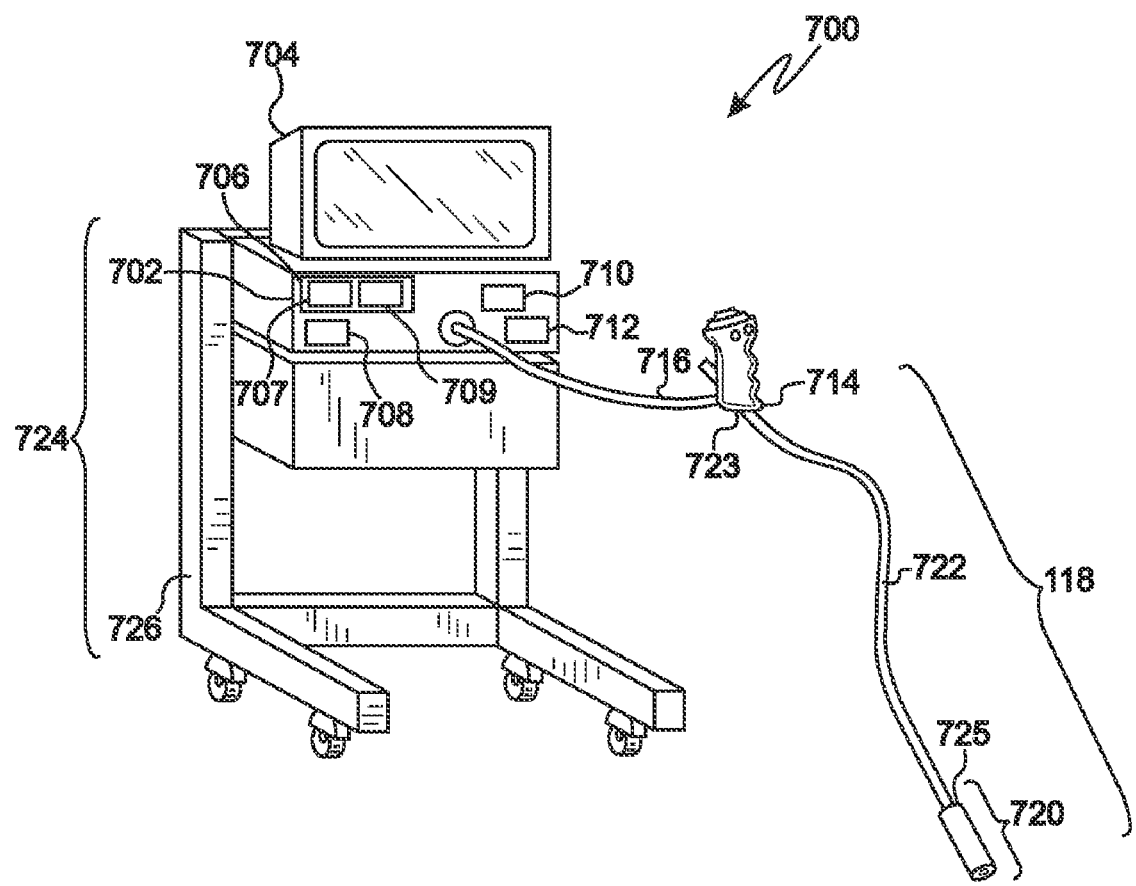
FIG. 7 is a diagrammatic view of a scanned beam endoscope, according to another embodiment, including an endoscope tip having a MEMS scanner that incorporates principles of the MEMS device shown in FIG. 1.
Figure 8:
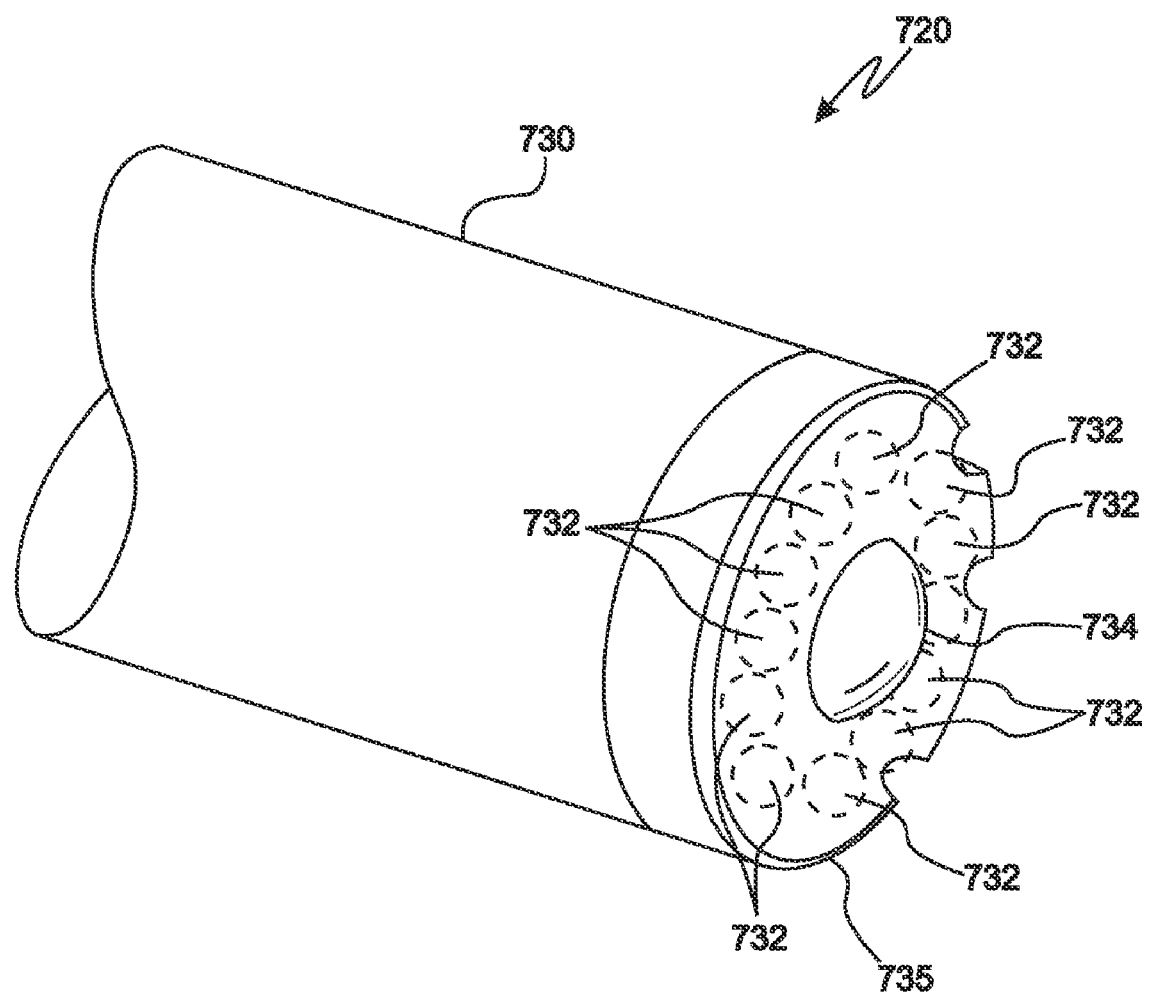
FIG. 8 is a schematic perspective view of the endoscope tip shown in FIG. 7.
Figure 9:
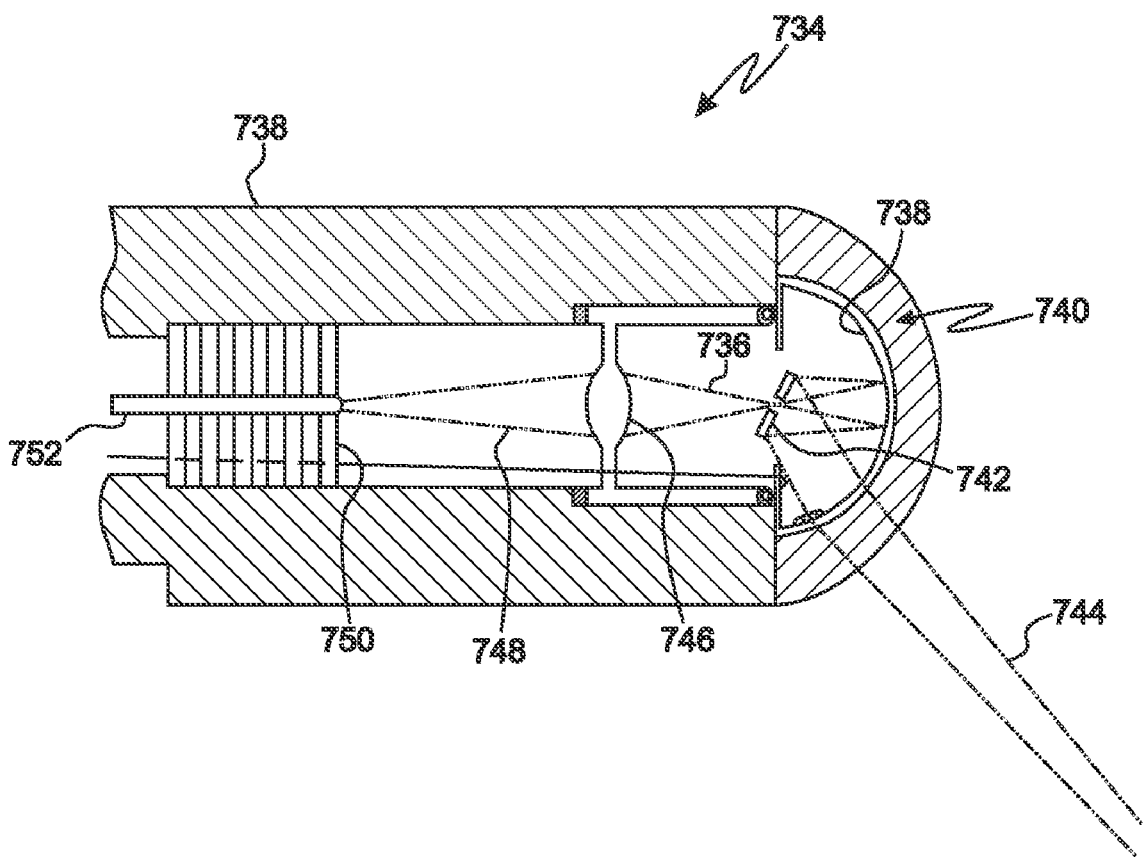
FIG. 9 is a schematic cross-sectional view of the endoscope tip shown in FIG. 8.

Referring to FIGS. 7-9, principles of any of the above-described MEMS device embodiments may also be employed in a scanned beam endoscope 700 for imaging a FOV according to one embodiment. Specialized endoscopes have been developed to best accomplish their intended function. For example, upper endoscopes are used for examination of the esophagus, stomach and duodenum, colonoscopes are used for examining the colon, angioscopes are used for examining blood vessels, bronchoscopes are used for examining the bronchi, laparoscopes are used for examining the peritoneal cavity, and arthroscopes are used for examining joint spaces. Instruments to examine the rectum and sigmoid colon, known as flexible sigmoidoscopes, have also been developed. The discussion of endoscopes herein generally applies to these and other types of endoscopes, and the term "endoscope" as used herein may encompass all these and other such devices.

Referring to the diagrammatic view of FIG. 7, the scanned beam endoscope 700 includes a control module 702 and monitor 704, all of which may be mounted on a cart 726, and collectively referred to as console 724. The control module 702 includes control electronics 706 for controlling the operation of a scanning tip 720 that comprise drive electronics 707 for driving a MEMS scanner 742 (FIG. 9) and sensing electronics 709 for determining a rotational position of the scanner 742. The control module 702 further includes an image processor 708 for processing image data signals associated with light reflected from a region of interest being imaged, a light source 710 coupled to the control electronics 706, and a light-detector module 712. A handpiece 714 is operably coupled to the control module 702 through an external cable 716 to enable an operator to manipulate a position and image collection functions of an endoscope tip 718.

Still referring to FIG. 7, the endoscope tip 718 includes a scanning tip 720 and a hollow, elongated body 722 having a proximal end 723 attached to the handpiece 714 and a distal end 725 attached to the scanning tip 720. The hollow, elongated body 722 encloses optical and electrical components, such as optical fibers and electrical wires, associated with the scanning tip 720. Depending upon the endoscope application, the elongated body 722 may be flexible or rigid. The scanning tip 720 includes a scanning module 734 (FIGS. 8 and 9) configured to scan a beam across a FOV, and a plurality of detection optical fibers 732 (FIG. 8) that collect light reflected from a region of interest in the FOV and transmit optical signals to the light detection module 712. The light-detector module 712 is operable to convert the optical signals received from the scanning tip 720 to electrical image data signals and transmit the electrical image data signals to the image processor 708. As with the aforementioned scanned beam imager embodiments, the light-detector module 712 may include one or more photodiodes for converting the light received from the region of interest to electrical image data signals. Although the light-detector module 712 is shown located in the control module 702, in another embodiment, one or more photodiodes may be physically integrated with scanning tip 720 and electrical image data signals converted thereby may be transmitted to the image processor 708 for processing via electrical wires instead of optical fibers.

FIGS. 8 and 9 illustrate the scanning tip 720 and a scanning module 734 of the scanning tip 720, respectively, in more detail. Referring to the schematic perspective view shown in FIG. 8, the scanning tip 720 includes a housing 730 that encloses and carries the scanning module 734, the detection optical fibers 732, and an end cap 735 affixed to the end of the housing 730. The detection optical fibers 732 may be disposed peripherally about the scanning module 734 within the housing 730 and transmit reflected light received from the region of interest to the light-detector module 112.

Referring to the schematic cross-sectional view shown in FIG. 9, the scanning module 734 has a housing 738 that encloses and supports a MEMS scanner 742 and associated components, an illumination optical fiber 752 affixed to the housing 738 by a ferrule 750 and coupled to the light source 710, and a beam shaping optical element 746. A dome 740 is affixed to the end of the housing 730 and may be hermetically sealed thereto in order to protect the sensitive components of the scanning module 734. In some embodiments, the light source 710 may output polarized light and the dome 740 may be structured to only transmit the scanned beam 744 when the scanned beam 744 exhibits a selected polarization. In the illustrated embodiment, the detection optical fibers 732 or other collection optics may be used to collect light received from the FOV.

In operation, the scanning tip 720 is inserted into a body cavity to image a region of interest of an organ or tissue. The illumination optical fiber 752 receives light from the light source 710 and outputs a beam 748 that is shaped by the beam shaping optical element 746 to form a shaped beam 736 having a selected beam shape. The shaped beam 736 may be transmitted through an aperture in the center of the MEMS scanner 742 or another opening in the MEMS scanner 742, reflected off a first reflecting surface 738 of the interior of the dome to the front of the scanner 742, and then reflected off of the scanner 742 as a scanned beam 744 through the dome 740. The scanned beam 744 is scanned across a FOV and reflected off the region of interest of the body cavity. The drive electronics 707 of the control electronics 710 (FIG. 7) drives the motion of the scanner 742. For example, the drive electronics 707 may output a drive signal having a waveform similar to any of the drive signals 200, 204, 208, or 212 shown in FIGS. 2A-2D. Additionally, the sensing electronics 709 of the control electronics 710 (FIG. 7) may determine a rotational position of the scanner 742 as the scanner 742 oscillates during "dead period" in which the drive electronics 707 of the control electronics 710 are not transmitting a drive-signal pulse using any of the previously described techniques.

At least a portion of the reflected light (e.g., specular reflected light and diffuse reflected light also referred to as scattered light) is collected by the detection optical fibers 732 of the scanning tip 720, transmitted to the light detection module 712 for conversion to electrical image signals that are subsequently transmitted to the image processor 708. The image processor 708 processes the image signals received from the scanning tip 720 to generate an image characteristic of the region of interest being imaged for display on the monitor 704. It is noted that in other embodiments, the conversion of the reflected light to electrical signals may occur at the scanning tip 720 and transmitted to the image processor 708 via electrical wires.

Although many of the above-described embodiments relate to MEMS devices for use in beam scanning applications (e.g., scanned beam imagers, scanned beam endoscopes, or scanned beam displays), the principles may be employed in non-optical applications. For example, a body supported by a frame may be moved (e.g., oscillated) by the drive electronics 116 and the position thereof determined by the sensing electronics 118. The body may be a body other than a scanner, such as a shutter for a MEMS valve, a MEMS gear, a MEMS mechanical actuator, or other MEMS application.

Although the present invention has been disclosed and described by way of some embodiments, it is apparent to those skilled in the art that several modifications to the described embodiments, as well as other embodiments of the present invention are possible without departing from the spirit and scope of the present invention.

The invention claimed is:
1. A MEMS device, comprising:
a frame;
a body coupled to and movable relative to the frame;
drive electronics operable to generate a drive signal that moves the body at an operational frequency, the drive signal including a plurality of drive-signal pulses; and
sensing electronics operable to sense a position of the body only when the drive-signal pulses are not being transmitted by the drive electronics.

2. The MEMS device of claim 1:
wherein the body comprises a scanner associated with at least one comb drive including a first set of comb fingers extending from the scanner and a second set of comb fingers; and further comprising sensing electronics operable to determine a rotational position of the scanner based at least in part on a capacitance between the first and second sets of comb fingers.

3. The MEMS device of claim 2 wherein the drive signal is applied to the first and second sets of comb fingers of the at least one comb drive.

4. The MEMS device of claim 2 wherein dedicated sensor-comb fingers are not included.

5. The MEMS device of claim 1 wherein:
the body comprises a scanner that is rotatable relative to the frame about at least one rotation axis; and the sensing electronics are operable to determine when the scanner rotates through the zero crossing.

6. The MEMS device of claim 1 wherein the body and the frame, together, are configured so that the body can be electrostatically driven or magnetically driven.

7. The MEMS device of claim 1 wherein:
the body and the frame each comprises comb fingers interdigitated with each other; and the drive electronics are operable to apply a voltage to the comb fingers to move the body.

8. The MEMS device of claim 1 wherein:
the body comprises a scanner that is rotatable relative to the frame about a fast-scan axis and a slow-scan axis; and the drive electronics are operable to oscillate the scanner about the fast-scan axis at the operational frequency and rotate the scanner about the slow-scan axis at another operational frequency.

9. The MEMS device of claim 1 wherein the drive frequency of the drive signal is selected so that one or more undesirable modes are not excited in the scanner.

10. A method, comprising:
driving motion of a MEMS scanner at an operational frequency with a drive signal that includes a plurality of drive-signal pulses; and sensing a parameter related to a position of the MEMS scanner only when the drive-signal pulses are not being transmitted.

11. The method of claim 10 wherein sensing a parameter related to a position of the MEMS scanner only when the drive-signal pulses are not being transmitted comprises:
sensing the parameter, wherein the parameter is related to a rotational position of the MEMS scanner.

12. The method of claim 10 wherein:
the MEMS scanner comprises at least one comb drive including a first set of comb fingers extending from the MEMS scanner and a second set of comb fingers; and sensing a parameter related to a position of the MEMS scanner only when the drive-signal pulses are not being transmitted comprises determining the position of the MEMS scanner based at least in part on capacitance between the first and second sets of comb fingers.

13. The method of claim 10 wherein sensing a parameter related to a position of the MEMS scanner only when the drive-signal pulses are not being transmitted comprises:
transmitting sensing-signal pulses only when the drive-signal pulses are not being transmitted.

14. A scanned beam imager, comprising:
at least one light source operable to output a beam;
a MEMS scanner positioned to receive the beam;
drive electronics operable to generate a drive signal that oscillates the MEMS scanner at an operational frequency to scan the beam across a field-of-view ("FOV"), the drive signal including a plurality of drive-signal pulses; and sensing electronics operable to sense a rotational position of the MEMS scanner only when the drive-signal pulses are not being transmitted; and at least one light detector operable to convert reflected light from the FOV to electrical signals.

15. A scanned beam endoscope, comprising:
a light source operable to provide light;
an endoscope tip including:
an illumination optical fiber having an output end and input end coupled to the light source;
a MEMS scanner positioned to receive the beam; and
at least one light detection element positioned to receive reflected light from the FOV;

drive electronics operable to generate a drive signal that oscillates the MEMS scanner at an operational frequency to scan the beam across a field-of-view ("FOV"), the drive signal including a plurality of drive-signal pulses; and sensing electronics operable to sense a position of the MEMS scanner only when the drive-signal pulses are not being transmitted.

* * * * *